(12) United States Patent
Spilman et al.

(10) Patent No.: US 11,845,863 B2
(45) Date of Patent: Dec. 19, 2023

(54) POLYURETHANE DISPERSIONS AND THEIR USE TO PRODUCE COATINGS AND ADHESIVES

(71) Applicant: CARLISLE CONSTRUCTION MATERIALS, LLC, Carlisle, PA (US)

(72) Inventors: Gary Spilman, Northville, MI (US); Michael Christy, Midland, MI (US); Austin Ardanowski, Wixom, MI (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 213 days.

(21) Appl. No.: 17/241,946

(22) Filed: Apr. 27, 2021

(65) Prior Publication Data

US 2021/0340374 A1    Nov. 4, 2021

Related U.S. Application Data

(60) Provisional application No. 63/019,795, filed on May 4, 2020, provisional application No. 63/019,820, filed on May 4, 2020.

(51) Int. Cl.
| | | |
|---|---|---|
| C08L 75/06 | (2006.01) |
| C08G 18/12 | (2006.01) |
| C08G 18/75 | (2006.01) |
| C08G 18/42 | (2006.01) |
| C09J 7/35 | (2018.01) |

(Continued)

(52) U.S. Cl.
CPC ............... *C08L 75/06* (2013.01); *B32B 5/18* (2013.01); *B32B 5/32* (2013.01); *B32B 7/12* (2013.01); *B32B 15/046* (2013.01); *B32B 15/082* (2013.01); *B32B 15/09* (2013.01); *B32B 15/18* (2013.01); *B32B 15/20* (2013.01); *B32B 27/065* (2013.01); *B32B 27/08* (2013.01); *B32B 27/22* (2013.01); *B32B 27/302* (2013.01); *B32B 27/304* (2013.01); *B32B 27/308* (2013.01); *B32B 27/36* (2013.01); *B32B 27/365* (2013.01); *C08G 18/0823* (2013.01); *C08G 18/10* (2013.01); *C08G 18/12* (2013.01); *C08G 18/348* (2013.01); *C08G 18/4213* (2013.01); *C08G 18/4216* (2013.01); *C08G 18/4238* (2013.01); *C08G 18/4829* (2013.01); *C08G 18/6659* (2013.01); *C08G 18/755* (2013.01); *C09D 175/06* (2013.01); *C09J 7/35* (2018.01); *C09J 175/06* (2013.01); *B32B 2250/02* (2013.01); *B32B 2250/22* (2013.01); *B32B 2250/24* (2013.01); *B32B 2307/542* (2013.01); *B32B 2439/70* (2013.01); *B32B 2479/00* (2013.01); *B32B 2605/00* (2013.01); *C08G 2150/00* (2013.01); *C08G 2170/00* (2013.01); *C08G 2170/20* (2013.01); *C08G 2170/80* (2013.01);

(Continued)

(58) Field of Classification Search
CPC .. C08L 75/06; C08L 2201/50; C08L 2207/20; C08G 18/12; C08G 18/10; C08G 18/755; C08G 18/4213; C08G 18/4238; C08G 18/348; C08G 18/4216; C08G 18/4829; C08G 18/6659; C08G 2170/00; C08G 2150/00; C08G 2170/80; C08G 2170/20; C08G 18/0823; C09D 175/06; C09J 7/35; C09J 175/06; C09J 2400/163; B32B 5/32; B32B 5/18; B32B 15/046; B32B 15/20; B32B 15/082; B32B 15/09; B32B 27/065; B32B 27/304; B32B 27/08; B32B 27/302; B32B 27/365; B32B 27/36; B32B 7/12; B32B 15/18; B32B 27/22; B32B 27/308; B32B 2250/24; B32B 2250/22; B32B 2439/70; B32B 2605/00; B32B 2250/02; B32B 2307/542; B32B 2437/02; B32B 2479/00

See application file for complete search history.

(56) References Cited

U.S. PATENT DOCUMENTS

| | | |
|---|---|---|
| 2,793,220 A | 5/1957 | Barrett |
| 4,054,561 A | 10/1977 | Strauss |

(Continued)

FOREIGN PATENT DOCUMENTS

| | | |
|---|---|---|
| CA | 104511 | 4/1907 |
| CA | 2215798 | 10/1996 |

(Continued)

OTHER PUBLICATIONS

I. Vitkauskiene, Chemija 19 (2008) 29.

(Continued)

Primary Examiner — Patrick D Niland
(74) Attorney, Agent, or Firm — Dilworth IP, LLC

(57) ABSTRACT

Aqueous polyurethane dispersions and coatings and heat-activatable adhesives made from the dispersions are disclosed. The dispersions include a polyurethane reaction product of a polyester polyol and a polyisocyanate. The polyester polyol comprises recurring units of at least one $C_2$-$C_6$ aliphatic diol, at least one aliphatic or cycloaliphatic $C_4$-$C_{10}$ dicarboxylic acid, and an aromatic diacid source, which can be recycled PET. The dispersion is formulated using 1 to 3 moles of an acid-functional diol per mole of polyester polyol. Dispersions for the adhesives are produced at NCO/OH molar ratios within the range of 0.90 to 0.98. The adhesives successfully bond a wide range of plastic and metal materials, often demonstrating substrate failure, even with steel. This contrasts with commercial adhesives such as EVA that exhibit only adhesive failure with the same substrates.

22 Claims, 1 Drawing Sheet

(51) Int. Cl.
  *C09J 175/06* (2006.01)
  *C09D 175/06* (2006.01)
  *B32B 5/32* (2006.01)
  *B32B 5/18* (2006.01)
  *B32B 15/04* (2006.01)
  *B32B 15/20* (2006.01)
  *B32B 15/082* (2006.01)
  *B32B 15/09* (2006.01)
  *B32B 27/06* (2006.01)
  *B32B 27/30* (2006.01)
  *B32B 27/08* (2006.01)
  *B32B 27/36* (2006.01)
  *B32B 7/12* (2006.01)
  *B32B 15/18* (2006.01)
  *B32B 27/22* (2006.01)
  *C08G 18/08* (2006.01)
  *C08G 18/10* (2006.01)
  *C08G 18/34* (2006.01)
  *C08G 18/48* (2006.01)
  *C08G 18/66* (2006.01)

(52) U.S. Cl.
  CPC ....... *C08L 2201/50* (2013.01); *C08L 2207/20* (2013.01); *C09J 2400/163* (2013.01)

(56) References Cited

U.S. PATENT DOCUMENTS

| | | | |
|---|---|---|---|
| 4,079,028 A | 3/1978 | Emmons | |
| 4,096,102 A | 6/1978 | Strauss | |
| 4,155,892 A | 5/1979 | Emmons | |
| 4,223,068 A | 9/1980 | Carlstrom | |
| 4,371,469 A | 2/1983 | Foglia | |
| 4,423,179 A | 12/1983 | Guagliardo | |
| 4,439,550 A | 3/1984 | Brennan | |
| 4,469,824 A | 9/1984 | Grigsby, Jr. | |
| 4,546,169 A | 10/1985 | Chandler | |
| 4,602,079 A | 7/1986 | Vinches | |
| 4,608,432 A | 8/1986 | Magnus | |
| 4,720,571 A | 1/1988 | Trowell | |
| 4,758,607 A | 7/1988 | Hallmark | |
| 5,138,027 A | 8/1992 | Van Beek | |
| 5,155,163 A | 10/1992 | Abeywardena et al. | |
| 5,252,615 A | 10/1993 | Rao | |
| 5,256,215 A | 10/1993 | Horimura | |
| 5,281,654 A | 1/1994 | Eisenhart | |
| 5,502,247 A | 3/1996 | Bartos | |
| 5,552,478 A | 9/1996 | Fisher | |
| 5,574,127 A | 11/1996 | Sau | |
| 5,608,000 A | 3/1997 | Duan et al. | |
| 5,756,554 A | 5/1998 | Fisher | |
| 5,763,526 A | 6/1998 | Harakawa et al. | |
| 5,922,779 A | 7/1999 | Hickey | |
| 5,932,666 A | 8/1999 | Fisher | |
| 5,948,828 A | 9/1999 | Reck | |
| 5,958,601 A | 9/1999 | Salsman | |
| 6,281,373 B1 | 8/2001 | Sato | |
| 6,337,366 B1 | 1/2002 | Amick | |
| 6,339,125 B1 | 1/2002 | Bechara et al. | |
| 6,359,022 B1 | 3/2002 | Hickey | |
| 6,573,304 B1 | 6/2003 | Durand | |
| 6,630,601 B1 | 10/2003 | Inada | |
| 6,635,723 B1 | 10/2003 | Maier et al. | |
| 6,642,350 B1 | 11/2003 | Asakawa | |
| 6,664,363 B1 | 12/2003 | Faunce | |
| 6,670,429 B2 | 12/2003 | Appelman | |
| 6,887,909 B2 | 5/2005 | Kawamura | |
| 6,997,909 B2 | 2/2006 | Goldberg | |
| 7,045,573 B2 | 5/2006 | Mayer et al. | |
| 7,192,988 B2 | 3/2007 | Smith | |
| 7,342,068 B2 | 3/2008 | Klingenberg et al. | |
| 7,560,526 B2 | 7/2009 | Shieh | |
| 8,334,357 B2 | 12/2012 | Schieferstein | |
| 8,454,793 B2 | 6/2013 | Carter | |
| 8,461,213 B2 | 6/2013 | Muenzenberg | |
| 8,524,649 B2 | 9/2013 | Leyrer | |
| 8,673,275 B2 | 3/2014 | Kim | |
| 8,697,797 B2 | 4/2014 | Suau | |
| 8,871,817 B2 | 10/2014 | Türk | |
| 2002/0035166 A1 | 3/2002 | Murayama | |
| 2007/0270518 A1 | 11/2007 | Nutzel | |
| 2009/0131625 A1 | 5/2009 | Kurian et al. | |
| 2014/0134534 A1 | 5/2014 | Sacripante | |
| 2016/0053050 A1 | 2/2016 | Tabor | |

FOREIGN PATENT DOCUMENTS

| | | |
|---|---|---|
| CN | 101090935 | 12/2007 |
| CN | 102782006 | 11/2012 |
| CN | 103113560 | 5/2013 |
| EP | 0558907 | 9/1993 |
| EP | 2565226 A1 | 3/2013 |
| JP | S60130620 | 7/1985 |
| JP | S6466264 A | 3/1989 |
| JP | 2000191766 | 7/2000 |
| JP | 2002114840 | 4/2002 |
| JP | 2004307583 A | 11/2004 |
| WO | 0024802 | 5/2000 |
| WO | 0075252 | 12/2000 |
| WO | 2004083274 | 9/2004 |
| WO | 2008067967 | 6/2008 |
| WO | 2011134872 | 11/2011 |
| WO | 2012135625 | 10/2012 |
| WO | 2013041552 | 3/2013 |
| WO | 2013154874 A1 | 10/2013 |

OTHER PUBLICATIONS

J. Cheong, A-P Coatings J., Aug. 2009, 23.
Mazurek et al. "PET Wastes utilization in the synthesis of aliphatic-aromatic polyurethane elastomers", Polym. Adv. Technol., (2014) 25, 1273-1284.
M. van der Wouden, Utech Asia '95, Paper # 34, (1995).
M. van der Wouden, Utech '94, Paper # 21, (1994).
D. Paszun et al., Ind. Eng. Chem. Res. 36 (1997).
K. Troev et al., J. Appl. Polym. Sci. 90 (2003) 1148.
N. Ikladious, J. Elast. Plast. 32 (2000) 140.
G. Spilman et al., Paint Coat. Ind., 33 (Sep. 2017) 52.
G. Spilman et al., Paint Coat. Ind., 34, May 2018.

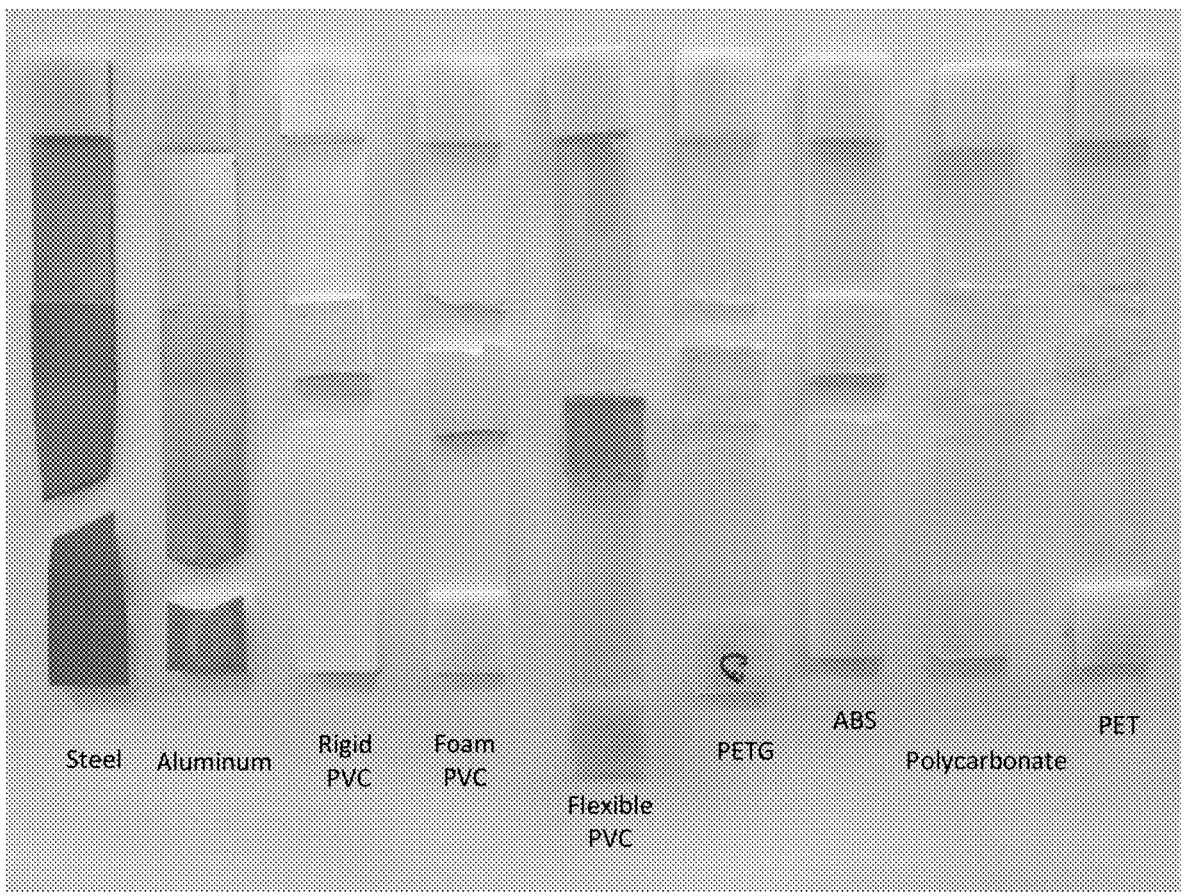

POLYURETHANE DISPERSIONS AND THEIR USE TO PRODUCE COATINGS AND ADHESIVES

FIELD OF THE INVENTION

The invention relates to aqueous polyurethane dispersions and coatings or heat-activated adhesive compositions made from the dispersions.

BACKGROUND OF THE INVENTION

General-purpose heat-activated ("hot-melt") adhesive compositions having the ability to bond effectively to a wide variety of different substrates are always in demand. Ethylene-vinyl acetate copolymers offer rubber-like softness, flexibility, and rapid set times for packaging applications, but their bond strength and ability to bond various metals (e.g., aluminum, steel) and plastics (e.g., ABS, polystyrene, or PVC) is limited.

Aqueous polyurethane dispersions (PUDs) have been used in paints and coatings and in adhesive applications for automotive, furniture, footwear, and food packaging. Challenges remain in making these formulations more sustainable. To date, only limited work has been performed to demonstrate that recycled thermoplastics, especially PET, can be successfully repurposed and upcycled to generate useful polyol intermediates for making PUD-based coatings and adhesives.

Heat-activated adhesives based on aqueous PUDs are normally formulated at relatively low NCO/OH molar ratios (i.e., less than 1.0). The formulations are designed to be stable in the presence of moist air, are made using dimethylolpropionic acid (DMPA) or other acid-functional polyols, and are activated by heating. In contrast, "reactive" hot-melt polyurethane adhesives are also known, but they are formulated at NCO/OH molar ratios greater than 1.0, typically 1.03 to 1.10, and rely at least in part on moisture curing of free NCO groups.

The industry would benefit from the availability of heat-activated adhesive compositions that can successfully bond different kinds of plastic and metal substrates. Paints and coatings that incorporate sustainable intermediates are needed. Ideally, the coating and adhesive compositions could take advantage of the world's abundant and ever-growing supply of waste thermoplastics, especially recycled polyethylene terephthalate (rPET).

SUMMARY OF THE INVENTION

In one aspect, the invention relates to an aqueous polyurethane dispersion. The dispersion comprises water and a dispersed polyurethane reaction product of a polyester polyol and a polyisocyanate. The polyester polyol comprises recurring units of: (a) at least one $C_2$-$C_6$ aliphatic diol; (b) at least one aliphatic or cycloaliphatic $C_4$-$C_{10}$ dicarboxylic acid; and (c) an aromatic diacid source. The amount of aromatic diacid source present is 2 to 50 wt. % based on the amount of polyester polyol. The polyester polyol has a hydroxyl number within the range of 56 to 240 mg KOH/g. The dispersion is formulated using 1 to 3 moles of an acid-functional diol per mole of polyester polyol. Additionally, the NCO/OH molar ratio of the dispersion is within the range of 0.90 to 0.98.

In another aspect, the invention relates to heat-activatable adhesives made from the aqueous dispersions described above. In other aspects, the invention relates to bonded substrates that incorporate the adhesives. The adhesives successfully bond a wide range of plastic and metal materials, often demonstrating substrate failure, even with steel. This contrasts with commercial adhesives such as EVA that exhibit only adhesive failure with the same substrates.

In another aspect, the invention relates to an aqueous dispersion like that described above but formulated up to 5 moles of the acid-functional diol per mole of the polyester polyol and an NCO/OH molar ratio within the range of 1.4 to 1.8. This dispersion is well-suited for making one-component coatings with good flexibility, gouge resistance, and substantial recycle content.

BRIEF DESCRIPTION OF THE DRAWING

FIG. 1 is a photograph showing results of lap-shear testing of various substrates joined by the inventive adhesive compositions. Substrate failure is demonstrated for each of steel, aluminum, rigid PVC, foam PVC, flexible PVC, glycol-modified PET, ABS, polycarbonate, and PET.

DETAILED DESCRIPTION OF THE INVENTION

In some aspects, the invention relates to an aqueous polyurethane dispersion comprising water and a dispersed polyurethane reaction product of a polyester polyol and a polyisocyanate.

The Polyisocyanate

Suitable polyisocyanates are cycloaliphatic or aromatic polyisocyanates. Suitable aromatic polyisocyanates include TDI, MDI, polymeric MDIs, 1,5-naphthalene diisocyanate, and mixtures thereof. Suitable cycloaliphatic polyisocyanates are well known and include, for example, isophorone diisocyanate, hydrogenated MDI's (e.g., $H_{12}$MDI), cyclohexane diisocyanate (CHDI), and 1,3-bis(isocyanatomethyl) cyclohexane ($H_6$XDI). In preferred aspects, the polyisocyanate is a cycloaliphatic polyisocyanate, especially isophorone diisocyanate, which is readily available.

The Polyester Polyol

The polyester polyols comprise recurring units of at least one $C_2$-$C_6$ aliphatic diol. Suitable diols include, for example, ethylene glycol, propylene glycol, diethylene glycol, dipropylene glycol, 1,3-propanediol, 2-methyl-1,3-propanediol, 1,2-butylene glycol, 1,3-butylene glycol, 1,4-butanediol, 1,5-pentanediol, 3-methyl-1,5-pentanediol, 1,6-hexanediol, neopentyl glycol, and the like. In some aspects, a combination of two or more of the $C_2$-$C_6$ aliphatic diols is used. At least in some cases, use of a combination of diols in making the polyester polyol can help to avoid undesirable side reactions that can occur when a single diol is used. In some aspects, for instance, a combination of ethylene glycol and propylene glycol; diethylene glycol and dipropylene glycol; 1,3-propanediol and 1,4-butanediol; or 2-methyl-1,3-propanediol and 1,4-butanediol is used. A combination of 1,3-propanediol and 1,4-butanediol is illustrated below in the experimental section (see Table 1).

The polyester polyols also comprise recurring units of at least one aliphatic or cycloaliphatic $C_4$-$C_{10}$ dicarboxylic acid. Suitable aliphatic or cycloaliphatic $C_4$-$C_{10}$ dicarboxylic acids include, for example, maleic acid, succinic acid, adipic acid, pimelic acid, suberic acid, azelaic acid, sebacic acid, 1,4-cyclohexanedicarboxylic acid, 1,3-cyclohexanedicarboxylic acid, and the like. Mixtures of aliphatic or cycloaliphatic $C_4$-$C_{10}$ dicarboxylic acids can be used. For instance, a combination of azelaic acid and adipic acid is used to make the polyester polyols shown in the experimental section below (see Table 1).

The polyester polyols further comprise recurring units of an aromatic diacid source. The amount of aromatic diacid source is 2 to 50 wt. % based on the amount of polyester polyol. In some aspects, the amount of diacid source is 5 to 40 wt. %, 10 to 40 wt. %, 5 to 30 wt. %, 5 to 25 wt. %, 5 to 20 wt. %, 5 to 15 wt. %, or 8 to 12 wt. % based on the amount of polyester polyol.

Suitable aromatic diacid sources include phthalic acid, phthalic anhydride, isophthalic acid, terephthalic acid, dimethyl terephthalate, as well as thermoplastic polyesters that include an aromatic diacid component, and side streams, waste streams, or distillation residues (e.g., DMT bottoms) that have aromatic diacid content. The thermoplastic polyesters are generally condensation polymers produced from the reaction of glycols and aromatic dicarboxylic acids or acid derivatives. Examples include polyethylene terephthalate (PET); polybutylene terephthalate (PBT); polytrimethylene terephthalate (PTT); glycol-modified polyethylene terephthalate (PETG); copolymers of terephthalic acid and 1,4-cyclohexanedimethanol (PCT); PCTA (an isophthalic acid-modified PCT); copolymers of diols with 2,5-furandicarboxylic acid or dialkyl 2,5-furandicarboxylates, e.g., polyethylene furanoate; copolymers of 2,2,4,4-tetramethyl-1,3-cyclobutanediol with isophthalic acid, terephthalic acid or orthophthalic derivatives; and the like, and mixtures thereof. Suitable thermoplastic polyesters include virgin polyesters, recycled polyesters, or mixtures thereof. Polyethylene terephthalate is particularly preferred, especially recycled polyethylene terephthalate (rPET), virgin PET, recycled PETG, virgin PETG, and mixtures thereof. For more examples of suitable thermoplastic polyesters, see U.S. Pat. Appl. Publ. No. 2009/0131625, the teachings of which are incorporated herein by reference.

Recycled polyethylene terephthalate suitable for use in making the inventive polyester polyols can come from a variety of sources. The most common source is the post-consumer waste stream of PET from plastic bottles or other containers. The rPET can be colorless or contain dyes (e.g., green, blue, or other colors) or be mixtures of these. A minor proportion of organic or inorganic foreign matter (e.g., paper, other plastics, glass, metal, etc.) can be present. A desirable source of rPET is "flake" rPET, from which many of the common impurities present in scrap PET bottles have been removed in advance. Another desirable source of rPET is pelletized rPET, which is made by melting and extruding rPET through metal filtration mesh to further remove particulate impurities. Because PET plastic bottles are currently manufactured in much greater quantity than any recycling efforts can match, scrap PET will continue to be available in abundance.

In some aspects, the thermoplastic polyesters are "digested" or "glycolyzed" by reaction with the two or more $C_2$-$C_6$ aliphatic diols described above in an initial reaction step. Once the thermoplastic material is liquefied, the at least one aliphatic or cycloaliphatic $C_6$-$C_{10}$ dicarboxylic acid is introduced, and the condensation reaction continues until a polyester polyol having targeted hydroxyl and acid values is obtained. The initial digestion is optionally performed in the presence of a catalyst, to give a digested intermediate. The digested intermediate will commonly be a mixture of diol reactants, diol(s) generated from the thermoplastic polyester, terephthalate oligomers, and other glycolysis products. For example, when PET or rPET is the thermoplastic polyester, the digested intermediate will include a mixture of diol reactant, ethylene glycol (generated from the PET or rPET), bis(2-hydroxyalkyl) terephthalate ("BHAT"), higher PET oligomers, and other glycolysis products. Similar digested mixtures in various forms have been made and characterized previously (see, e.g., D. Paszun et al., *Ind. Eng. Chem. Res.* 36 (1997) 1373 and N. Ikladious, *J. Elast. Plast.* 32 (2000) 140). Heating is advantageously performed at temperatures within the range of 80° C. to 260° C., preferably 100° C. to 250° C., more preferably 130° C. to 240° C., and most preferably 160° C. to 230° C.

Catalysts suitable for making the digested intermediate are well known (see, e.g., K. Troev et al., *J. Appl. Polym. Sci.* 90 (2003) 1148). In particular, suitable catalysts comprise titanium, zinc, antimony, germanium, zirconium, manganese, or other metals. Specific examples include titanium alkoxides (e.g., tetrabutyl titanate or tetraisopropyl titanate), titanium(IV) phosphate, zirconium alkoxides, zinc acetate, lead acetate, cobalt acetate, manganese(II) acetate, antimony trioxide, germanium oxide, or the like, and mixtures thereof. Catalysts that do not significantly promote isocyanate reaction chemistries are preferred. Catalysts comprising titanium, particularly titanium alkoxides, are especially preferred. The amount of catalyst used is typically in the range of 0.005 to 5 wt. %, preferably 0.01 to 1 wt. %, more preferably 0.02 to 0.7 wt. %, based on the total amount of polyol being prepared.

Usually, the digestion reaction is performed by heating the thermoplastic polyester, diol(s), and any catalyst at least until the mixture liquefies and particles of the thermoplastic polyester are no longer apparent. Reaction times range from about 30 minutes to about 16 hours, more typically 1 to 10 hours, even more typically 3 to 8 hours, and will depend on the reaction temperature, source of the thermoplastic polyester, the particular diol reactants used, mixing rate, desired degree of depolymerization, and other factors that are within the skilled person's discretion.

The molar ratio of diol or diols to thermoplastic polyester is preferably within the range of 1.5 to 4.5, more preferably 2.0 to 3.5.

In other aspects, the thermoplastic material is simply combined and heated in a single reaction step with the at least one $C_2$-$C_6$ aliphatic diol and the at least one aliphatic or cycloaliphatic $C_4$-$C_{10}$ dicarboxylic acid.

The polyester polyols have hydroxyl numbers within the range of 56 to 240 mg KOH/g, preferably 90 to 150 mg KOH/g, or 110 to 130 mg KOH/g. Hydroxyl number can be measured by any accepted method for such a determination, including, e.g., DIN 53240-2 ("Determination of Hydroxyl Value—Part 2: Method with Catalyst").

The polyester polyols preferably have number-average molecular weights (Mn) as measured by gel-permeation chromatography within the range of 400 to 2000 g/mol, or 1000 to 1800 g/mol.

The polyester polyols are ideally flowable liquids, at least when warmed to 75° C., and preferably also under ambient conditions. Preferably, the polyols have viscosities measured at 75° C. less than 1,500 cP, more preferably less than 1,200 cP, most preferably less than 750 cP. A preferred range for the polyol viscosity is 50 to 1,000 cP at 75° C., more preferably 50 to 500 cP at 75° C. Viscosity can be determined by any industry-accepted method. It is convenient to use, for instance, a Brookfield viscometer (such as a Brookfield DV-III Ultra rheometer) fitted with an appropriate spindle, and to measure a sample at several different torque settings to ensure an adequate confidence level in the measurements.

The polyester polyols preferably have low to intermediate acid numbers. Low acid numbers can be ensured by driving reactions by removal of water from the reaction mixture to the desired level of completion. Preferably, the polyols have an acid number less than 30 mg KOH/g, more preferably 5 to 20 mg KOH/g, and most preferably less than 10 mg KOH/g.

The Aqueous Polyurethane Dispersions

The polyurethane dispersions incorporate an acid-functional diol. Suitable acid-functional diols have a carboxylic acid group and at least one hydroxyl group. Exemplary acid-functional diols include dimethylolpropionic acid (DMPA), dimethylolbutanoic acid (DMBA), and the like, and mixtures thereof. The acid-functional diol imparts water-dispersibility to the prepolymer, usually upon its combination with water and a basic neutralizing agent.

Numerous ways to formulate aqueous polyurethane dispersions are known and suitable for use. Usually, the polyurethane dispersion is made by emulsifying an isocyanate-terminated prepolymer produced from the polyester polyol and the aromatic or cycloaliphatic polyisocyanate in water in the presence of the acid-functional diol, one or more solvents, and optional polyol components such as an alkoxylated trimethylolpropane or the like. Water, a water-soluble polyamine chain extender, or a combination thereof may be reacted with the emulsified prepolymer.

The aqueous dispersions include water, generally 50 to 80 wt. %, 55 to 75 wt. %, or 60 to 70 wt. %, based on the amount of dispersion.

The acid-functional diol is used in an amount within the range of 1 to 3 moles of acid-functional diol per mole of polyester polyol. In some aspects, this molar ratio is 1.3 to 2.5, 1.5 to 2.4, 1.6 to 2.4, 1.8 to 2.2, or 1.9 to 2.1. Some free carboxylic acid functionality in the polyester polyol allows for neutralization with an amine or other basic reactant to generate a water-dispersible polyurethane. However, too much acid functionality can impart an undesirable level of water sensitivity to the coating or adhesive product.

In some aspects, particularly for PUDs used for adhesives, the acid-functional diol is DMPA, DMBA, or a mixture thereof, and the amount incorporated into the polyurethane (excluding water or solvents) is within the range of 3.5 to 15 wt. %, or from 5 to 13 wt. %. The skilled person can adjust the amount to use based on the type of substrates being bonded. For instance, a higher proportion of the DMPA or DMBA may be more desirable for bonding metals, while a lower proportion may be better for bonding certain plastics.

In some aspects, the aqueous dispersions have isocyanate to hydroxyl (NCO/OH) molar ratios within the range of 0.90 to 0.98, or within the range of 0.92 to 0.96, or from 0.925 to 0.950. When the NCO/OH molar ratio is below 1.0, the dispersions are particularly well-suited for use in heat-activated (hot-melt) adhesives.

In certain aspects, particularly for the PUDs used to make coatings, chain extenders may be used to extend the molecular weight of polyurethane polymer contained within the aqueous polyurethane dispersion. Suitable chain extenders contain at least two functional groups that can react with isocyanates, e.g., hydroxyl, thio, or amino groups in any combination. Examples include ethylenediamine, piperazine, hydrazine, 1,4-butanediol, 1,6-hexanediol, N-methyldiethanolamine, and the like, and mixtures thereof.

In a typical example, the polyester polyol and the acid-functional diol (e.g., DMPA or DMBA) are combined and reacted with the polyisocyanate (e.g., isophorone diisocyanate) in the presence of a tin catalyst (e.g., dibutyltin dilaurate) or a bismuth catalyst (e.g., bismuth dioctanoate) and a water-compatible solvent (e.g., acetone or methyl ethyl ketone). The resulting prepolymer is then dispersed in a mixture of water, neutralizing agent (e.g., triethylamine), and a defoamer. The resulting aqueous polyurethane dispersion is well-suited for use in making coatings and adhesives of the invention.

For more examples of suitable approaches for preparing aqueous polyurethane dispersions, see U.S. Pat. Nos. 5,155,163; 5,608,000; 5,763,526; 6,339,125; 6,635,723; 7,045,573; and 7,342,068, the teachings of which are incorporated herein by reference.

Heat-Activated Adhesives

In some aspects, the aqueous polyurethane dispersions are used to make heat-activated adhesives. Dispersions for these aspects are formulated at relatively low index, i.e., at NCO/OH molar ratios within the range of 0.90 to 0.98. The dispersions also omit the auxiliary polyol (e.g., alkoxylated trimethylolpropane) typically used for making 1K PUD coatings. The molar ratio of DMPA to polyol is within the range of 1 to 3. The aqueous mixture is applied to a substrate of choice by any suitable means, such as a pipette or dropper, then dried to a solid. The adhesive is not activated until the resulting film is heated. Substrates are pressed together and preferably heated under pressure.

The inventive adhesives demonstrate good performance across a broad range of substrates, including ABS, aluminum, steel, rigid or flexible polyvinyl chloride (PVC), polycarbonate, PET, and glycol-modified PET (PETG). Lap-shear testing reveals that a commercial multi-purpose EVA adhesive bonds these materials with only adhesive failure. In contrast, the inventive adhesives frequently deliver a strong bond characterized by substrate failure, particularly when the polyester polyol incorporates an elevated content of rPET (see Table 3, below).

In some aspects, formulations utilizing polyester polyols having 5 to 25 wt. %, or 5 to 15 wt. %, of rPET, especially about 10 wt. % of rPET, can form bonds stronger than steel. This is especially true when the ratio of the acid-functional diol to polyol is within the range of 1.6 to 2.4, or from 1.8 to 2.2, and the NCO/OH molar ratio is within the range of 0.90 to 0.98, or from 0.92 to 0.96 (see Table 4).

Coatings from the Aqueous Polyurethane Dispersions

In some aspects, the invention relates to one-component coatings made from the aqueous polyurethane dispersions. The coatings utilize dispersions like those described for making the adhesives, but with some modifications. The coatings are formulated using up to 5 moles of an acid-functional diol per mole of the polyester polyol and at an NCO/OH molar ratio within the range of 1.4 to 1.8. The resulting coatings have good flexibility, gouge resistance, and substantial recycle content (see Table 2, below). The examples below illustrate one-component coatings from PUDs formulated with an NCO/OH molar ratio of 1.6:1.0 using DMPA and an alkoxylated trimethylolpropane, then chain extended with ethylenediamine.

The following examples merely illustrate the invention; the skilled person will recognize many variations that are within the spirit of the invention and scope of the claims.

Polyol Synthesis

A series of difunctional polyols having 0 to 40 wt. % PET content (in increments of 10 wt. %) and similar number-average molecular weights is produced by digesting recycled PET in the presence of a 1,4-butanediol (Polyol E) or a mixture of 1,4-butanediol and 1,3-propanediol (Polyols A-D) at up to 250° C. for 4 h. A mixture of azelaic acid and adipic acid is then introduced, and heating continues until the hydroxyl value is in the range of 110 to 125 mg KOH/g and the acid value is less than 5 mg KOH/g.

One-Component (1K) Coatings from Aqueous PUDs

Aqueous polyurethane dispersions are prepared using isophorone diisocyanate (IPDI) and a modification of the method described in G. Spilman et al., *Paint Coat. Ind.*, 33 (September 2017) 52. Acetone is used instead of N-methyl-2-pyrrolidone, and the maximum reaction temperature is controlled by the solvent. A 3-inch Cowles blade is used with an inverted impeller installed 15 mm above the Cowles blade. A syringe pump is used to meter neutralizer and water to the reaction mixture. The dispersions are drawn using a #70 wire-wound bar. The drawn films are flashed at room temperature for 1 h, then force dried for 1 h at 130° C. Dry film thicknesses range from 1.20 to 1.80 mils.

The PUD compositions are based on a formulation described previously (see G. Spilman et al., *Paint Coat. Ind.*, 34, May 2018). The PUDs are formulated with an NCO/OH molar ratio of 1.6:1.0 using dimethylolpropionic acid at 4.5 wt. % and 9 wt. % alkoxylated trimethylolpropane (Ymer™ N120) on prepolymer solids, both supplied by Perstorp. Dispersions are chain extended with ethylenediamine to 95%.

Coating Properties

1. Impact and Flexibility

All of the 1K coatings pass mandrel bend at ⅛ inch (ASTM D522-17), and all pass direct and reverse impact of 160 inch-pounds (ASTM D2794-93) except for the coating based on Polyol D, which has a direct impact failure at 60 inch-pounds and a reverse impact failure at <10 inch-pounds. The coatings exhibit excellent flexibility regardless of the amount of recycled PET (rPET) in the polyol composition. In the higher shear test (impact), levels of rPET above 30 wt. % may be detrimental, but this is not apparent with the lower shear (mandrel) test even at 40 wt. % rPET.

2. Stain Testing

Stain testing results for the 1K PUD coatings appear in Table 2. To apply chemical spots, filter paper is placed onto the coating surface, and the reagents are applied to filter paper. Each spot is covered with a watch glass and exposed for 1 h, except for water (24 h). After the allotted time, stains are uncovered and rated according to ASTM D1308-02 from 5 (no effect) to 1 (total removal of the coating). PET content in the polyol has little or no impact on stain performance for the PUD systems. Performance is good against vinegar, Betadine® antiseptic and water, but susceptibility to Windex® cleaner, ethanol and Skydrol® fluid is observed.

3. Adhesion Testing

Adhesion testing is performed over aluminum substrates (Q-Panel A-46). Cross-hatch (ASTM D3359-17) evaluations are performed with a Gardco® P.A.T. tester with PA2056 six-tooth blade at 2.0-mm spacing. The 1K PUDs exhibit excellent adhesion to aluminum (see Table 2).

4. Pendulum Hardness

Hardness generally increases with increasing levels of rPET; however, the slight reduction in hardness at 40 wt. % rPET suggests a possible optimal composition for hardness (see results in Table 2). The 1K PUD coatings are relatively smooth and glassy.

5. Pencil Hardness

Pencil hardness is performed according to ASTM D3363-05. The test utilizes Mitusbishi JPIA pencils rating from 6B to 9H. The pencil test assesses two different modes of failure: pencil scratch, indicating the first sign of coating damage, and pencil gouge, indicating full excavation of the coating. A 10 rating corresponds to a 2H rating. The 1K PUDs exhibit excellent gouge resistance, with the average between 6H and 7H. However, scratch resistance is relatively low, with the 10 wt. % rPET 1K PUD coating achieving only a 6B rating. Above 20 wt. % rPET, a maximum rating of B is observed (Table 2).

6. Free Films

Free films (ASTM D4708-12) are cast to evaluate elongation and tensile strength of the 1K PUD films. Films are formed by applying a thin layer of the PUD to a 6"×6" bottomless, square cake mold over a silicone mat. Films are allowed to flash for five days before removal from the silicone mat. The films dry upright for three days. Test specimens (½-inch width) are cut using a razor blade. Thicknesses are measured with a micrometer. Strips are pulled at 1-inch gauge length on an MTS Sintech 2/G. Ten strips are tested for each sample, and the most consistent (width, thickness, and observed strength) five data points are considered representative.

An optimal composition trend is observed (Table 2). As the rPET content of the polyol approaches 20-30 wt. %, tensile strength reaches a maximum. Elongation continuously drops as rPET content increases. However, a nice balance of strength and elongation is seen at moderate rPET levels. Above 30 wt. % rPET in the polyol, elongation and peak stress of the free film show a decline in performance. However, even an unoptimized formulation provides 260-270 psi at almost 700% elongation.

Heat-Activated Adhesives

Aqueous PUDs are formulated with an NCO/OH molar ratio of 0.9:1.0 and a 1.5:1.0 molar ratio of DMPA to polyol hydroxyl. No alkoxylated trimethylolpropane is included. A commercial multipurpose EVA hot-melt adhesive is used for comparison. PUDs are first applied to the substrate using a pipette. Substrates, listed below, are cut to 4"×1"×0.25". The area of overlap is 1 int. The PUD is dried to a solid. Heat is then applied to activate adhesive properties. Substrates are pressed together at approximately 70 psi. The samples are cooled to room temperature and pulled in a lap shear configuration. Testing is performed using an MTS Sintech 2/G equipped with a 10-kN load cell. Substrates: acrylonitrile-butadiene-styrene copolymer (ABS), aluminum, steel, rigid polyvinyl chloride (PVC), polycarbonate, nylon, glycol-modified PET (PETG), polystyrene, flexible PVC, and PET. Adhesive performance is summarized in Table 3.

As shown in Table 3, the multipurpose EVA adhesive demonstrates adhesive failure over all substrates. In contrast, the PUD adhesives demonstrate increasing strength at higher rPET levels for the aluminum, PETG, flexible PVC and polycarbonate substrates. For these substrates, 30-40 wt. % rPET produces substrate failure, while cohesive failure occurs at 10-20 wt. % rPET. All of the adhesives made from rPET polyols outperform EVA on these substrates.

With steel and nylon substrates, a bell-shaped response to additional rPET is observed, suggesting an optimal rPET composition for these substrates. At peak performance (10 wt. % rPET), the failure mode is consistently cohesive.

The rPET-based compositions generally underperform EVA only on the polystyrene and PET substrates and outperform EVA on the other eight substrates. However, for the PET substrate, although the peak stress is higher for the EVA sample, the 30-40 wt. % rPET adhesives fail by substrate failure rather than by adhesive failure.

On ABS, cohesive failure is observed at 10 wt. % rPET, while substrate failure is the rule at 20-40 wt. % PET. All of the experimental adhesives outperform EVA.

With rigid PVC, the inventive adhesives, all characterized by substrate failure, outperform the EVA adhesive.

More recent work on similar formulations has demonstrated substrate failure in lap shear testing across a wide range of substrates, including steel, aluminum, rigid PVC, foam PVC, flexible PVC, PETG, ABS, polycarbonate, and PET. FIG. 1 shows photographic evidence from these additional tests.

In other experiments, the same series of rPET polyols is used to formulate PUD adhesives as described above at different NCO/OH molar ratios within the range of 0.900 and 0.950 and at different molar ratios of DMPA to polyol within the range of 1.5 to 3.0. These results appear in Table 4.

Remarkably, under some conditions (e.g., with 10 wt. % rPET, a 2.0 molar ratio of DMPA to polyol, and NCO/OH indices between 0.925 and 0.950), the bonds formed are sufficient to cause substrate failure with steel (Table 4, first four entries). Conditions can also be found to formulate water-free or solvent-based hot-melt adhesives, as is shown in the third and fourth entries in Table 4.

TABLE 1

PET-based Polyols

| Polyol | PET, wt. % | 1,4-bu-tanediol, wt. % | 1,3-propanediol, wt. % | azelaic acid, wt. % | adipic acid, wt. % | OH value, mg KOH/g |
|---|---|---|---|---|---|---|
| A | 10 | 19.8 | 16.7 | 11.0 | 42.5 | 125 |
| B | 20 | 17.5 | 15.1 | 9.7 | 37.6 | 123 |
| C | 30 | 16.0 | 13.5 | 8.4 | 32.2 | 119 |
| D | 40 | 14.1 | 11.9 | 7.0 | 27.0 | 119 |
| E | 0 | 42.3 | 0 | 11.9 | 45.8 | 126 |

TABLE 2

1K PUD Coating Properties

| | wt. % PET | | | | |
|---|---|---|---|---|---|
| | 0 | 10 | 20 | 30 | 40 |
| Stain tests | | | | | |
| vinegar, 1-h | | | 4 | | |
| Windex ® cleaner, 1-h | | | 1-2 | | |
| ethanol, 50%, 1-h | | | 2 | | |
| Betadine ® antiseptic, 1-h | | | 4 | | |
| Skydrol ® fluid, 1-h | | | 1 | | |
| water, 24-h | | | 4 | | |
| Cross-hatch adhesion, B, Al | 5.0 | 5.0 | 5.0 | 5.0 | 5.0 |
| König hardness, s | 21 | 26 | 33 | 52 | 40 |
| Pencil hardness, scratch | 1 | 1 | 2 | 6 | 5 |
| Pencil hardness, gouge | 15 | 16 | 15 | 16 | 13 |
| Peak stress, psi | 220 | 190 | 270 | 260 | 160 |
| Elongation, % | 900 | 820 | 700 | 700 | 350 |

TABLE 3

Lap Shear Strength of Adhesives: Peak Stress[1] and Failure Mode[2]

| Substrate | 0% PET | 10% PET | 20% PET | 30% PET | 40% PET | EVA[3] |
|---|---|---|---|---|---|---|
| ABS | 3033 C | 3145 C | 3154 S | 2892 S | 3067 S | 1384 A |
| aluminum | 1488 A | 1626 A | 1731 C | 2364 S | 2472 S | 849 A |
| steel | 7709 C | 8486 C | 8512 C | 7225 C | 5321 C | 785 A |
| rigid PVC | 4083 S | 2780 S | 4080 S | 2637 S | 5220 S | 1250 A |
| polycarbonate | 1884 C | 1193 C | 3144 C | 3154 S | 3281 S | 1163 A |
| nylon | 2898 C | 3144 C | 2726 C | 1334 A | 333 A | 1385 A |
| glycol-modified PET | 1966 C | 3578 C | 1267 C | 2257 S | 2222 S | 813 A |
| polystyrene | 634 A | 631 A | 176 A | 163 A | 184 A | 1514 A |
| flexible PVC | 693 C | 581 C | 832 C | 891 S | 868 S | 327 A |
| PET | 475 S | 724 C | 749 C | 292 S | 543 S | 1239 A |

[1]Peak stress in kg-m/s;
[2]Failure modes: A = adhesive failure; C = cohesive failure; S = substrate failure;
[3]EVA = commercial ethylene-vinyl acetate adhesive.

TABLE 4

Heat-Activated Adhesives from PUDs

| Ex. | Polyol | wt. % PET | DMPA/ polyol (mol/mol) | NCO:OH molar ratio | Aqueous PUD? | lbf[3] at break | Breaks steel? |
|---|---|---|---|---|---|---|---|
| 1 | A | 10 | 2.0 | 0.925 | Yes | 7550 | Yes |
| 2 | A | 10 | 2.0 | 0.950 | Yes | 7945 | Yes |
| 3 | A | 10 | 2.0 | 0.934 | No[1] | 7850 | Yes |
| 4 | A | 10 | 2.0 | 0.933 | No[2] | 7779 | Yes |
| 5 | A | 10 | 1.5 | 0.900 | Yes | 8486 | No |
| 6 | A | 10 | 3.0 | 0.925 | Yes | 4991 | No |
| 7 | A | 10 | 2.5 | 0.950 | Yes | N/A | N/A |
| 8 | B | 20 | 1.5 | 0.900 | Yes | 8512 | No |
| 9 | B | 20 | 2.5 | 0.925 | Yes | 7965 | No |
| 10 | C | 30 | 1.5 | 0.900 | Yes | 7225 | No |
| 11 | D | 40 | 1.5 | 0.900 | Yes | 5321 | No |
| 12 | E | 0 | 2.5 | 0.925 | Yes | N/A | N/A |
| 13 | E | 0 | 1.2 | 0.900 | Yes | N/A | No |
| 14 | E | 0 | 1.5 | 0.900 | Yes | 7709 | No |

[1]MEK-based hot-melt adhesive.
[2]Solvent-free hot-melt adhesive.
[3]lbf = pounds of force (1.0 lbf = 4.448N).

The preceding examples are meant only as illustrations; the following claims define the inventive subject matter.

We claim:

1. An aqueous polyurethane dispersion comprising water and a dispersed polyurethane reaction product of a polyester polyol and an aromatic or cycloaliphatic polyisocyanate, wherein the polyester polyol comprises recurring units of:
   (a) at least one $C_2$-$C_6$ aliphatic diol;
   (b) at least one aliphatic or cycloaliphatic $C_4$-$C_{10}$ dicarboxylic acid; and
   (c) 2 to 50 wt. %, based on the amount of polyester polyol, of an aromatic diacid source; and
   wherein the polyester polyol has a hydroxyl number within the range of 56 to 240 mg KOH/g; and
   wherein the dispersion is formulated using 1 to 3 moles of an acid-functional diol per mole of polyester polyol; and
   wherein the NCO/OH molar ratio of the dispersion is within the range of 0.90 to 0.98.

2. The polyurethane dispersion of claim 1 wherein the polyisocyanate comprises isophorone diisocyanate.

3. The polyurethane dispersion of claim 1 wherein the $C_2$-$C_6$ aliphatic diol comprises a mixture of 1,4-butanediol and 1,3-propanediol.

4. The polyurethane dispersion of claim 1 wherein the aliphatic $C_4$-$C_{10}$ dicarboxylic acid comprises azelaic acid, adipic acid, or a mixture thereof.

5. The polyurethane dispersion of claim 1 wherein the aromatic diacid source is polyethylene terephthalate (PET), recycled PET, or a mixture thereof.

6. The polyurethane dispersion of claim 5 comprising 5 to 40 wt. %, based on the amount of polyester polyol, of the aromatic diacid source.

7. The polyurethane dispersion of claim 5 comprising 10 to 40 wt. %, based on the amount of polyester polyol, of recycled PET.

8. The polyurethane dispersion of claim 1 wherein the acid-functional diol is dimethylolpropionic acid, dimethylolbutanoic acid, or a mixture thereof.

9. The polyurethane dispersion of claim 1 comprising 1.3 to 2.5 moles of the acid-functional diol per mole of polyester polyol.

10. The polyurethane dispersion of claim 1 wherein the polyester polyol has a hydroxyl number within the range of 90 to 150 mg KOH/g.

11. The polyurethane dispersion of claim 1 wherein the NCO/OH molar ratio of the dispersion is within the range of 0.92 to 0.96.

12. A heat-activatable adhesive comprising the polyurethane dispersion of claim 1.

13. An essentially water-free, heat-activatable adhesive made from the polyurethane dispersion of claim 1.

14. A bonded substrate comprising a cured layer of the adhesive of claim 12 and one or more materials selected from the group consisting of steel, aluminum, unplasticized polyvinyl chloride, plasticized polyvinyl chloride, polyvinyl chloride foam, polyethylene terephthalate, glycol-modified polyethylene terephthalate, ABS resin, and polycarbonate.

15. The bonded substrate of claim 14 capable of substrate failure when tested for lap-shear strength by ASTM D1002 (for metals) or ASTM D3163 (for plastics).

16. A bonded substrate comprising a cured layer of the adhesive of claim 13 and one or more materials selected from the group consisting of steel, aluminum, unplasticized polyvinyl chloride, plasticized polyvinyl chloride, polyvinyl chloride foam, polyethylene terephthalate, glycol-modified polyethylene terephthalate, ABS resin, and polycarbonate.

17. The bonded substrate of claim 16 capable of substrate failure when tested for lap-shear strength by ASTM D1002 (for metals) or ASTM D3163 (for plastics).

18. The polyurethane dispersion of claim 1 wherein the polyester polyol comprises recurring units of:
(a) 1,4-butanediol and 1,3-propanediol;
(b) azelaic acid and at least one other aliphatic or cycloaliphatic $C_4$-$C_{10}$ dicarboxylic acid; and
(c) 5 to 25 wt. %, based on the amount of polyester polyol, of recycled PET; and
wherein the polyester polyol has a hydroxyl number within the range of 110 to 135 mg KOH/g;
wherein the dispersion is formulated using 1.6 to 2.4 moles of dimethylolpropionic acid per mole of polyester polyol;
and
wherein the NCO/OH molar ratio of the dispersion is within the range of 0.90 to 0.98.

19. A heat-activatable adhesive comprising the polyurethane dispersion of claim 18.

20. A bonded substrate comprising a cured layer of the adhesive of claim 19 and one or more materials selected from the group consisting of steel, aluminum, unplasticized polyvinyl chloride, plasticized polyvinyl chloride, polyvinyl chloride foam, polyethylene terephthalate, glycol-modified polyethylene terephthalate, ABS resin, and polycarbonate.

21. The bonded substrate of claim 20 capable of substrate failure when tested for lap-shear strength by ASTM D1002 (for metals) or ASTM D3163 (for plastics).

22. The bonded substrate of claim 20 wherein the substrate is steel.

* * * * *